72257
LOUIS B. F. ZITKOV
IMP'D. STALL
PATENTED
DEC 17 1867
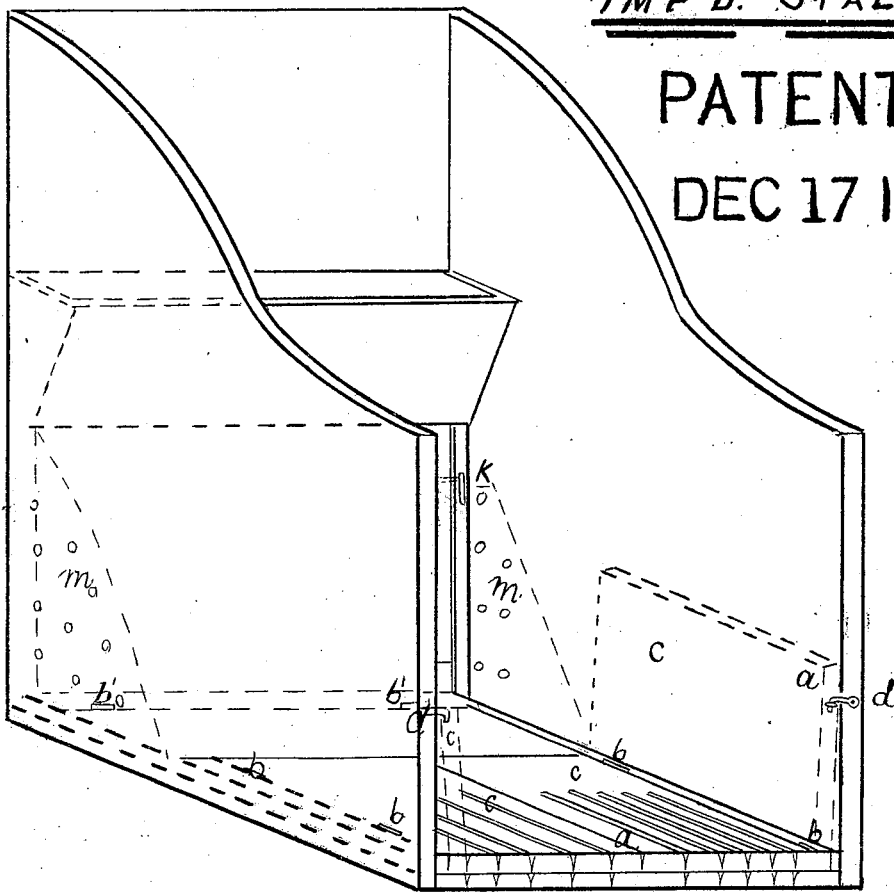
Witness
Henry C. Houston
Wm Frank Searcy
Inventor
Louis B. F. Zitkov
Per atty U. H. Clifford

United States Patent Office.

LOUIS B. F. ZITKOV, OF PORTLAND, MAINE.

Letters Patent No. 72,257, dated December 17, 1867.

---

IMPROVEMENT IN STALLS FOR CATTLE AND HORSES.

---

The Schedule referred to in these Letters Patent and making part of the same.

---

TO ALL WHOM IT MAY CONCERN:

Be it known that I, LOUIS B. F. ZITKOV, of Portland, in the county of Cumberland, and State of Maine, have invented a new and useful Improved Stall for Horses and Cattle; and I hereby declare the following to be a full, clear, and exact description thereof, which will enable others to make and use my invention, reference being had to the accompanying drawings, forming part of this specification, in which is shown an isometrical view of my improved stall.

In the common style of stalls, the same floor is used both night and day, and from being constantly dampened by the excrement of the animal, it in a short time becomes rotten, and is also injurious to the hoofs of horses. In addition to this, a great waste of the straw, or other material used for bedding, is occasioned by this moisture, as it is impossible to use the same bed for the animal more than once or twice.

To obviate these objections is the purpose of my invention. I do this by supplying the stall with a secondary or false floor, which may be taken up or raised during the day, allowing to drain and dry, and can be put down at night, furnishing a dry floor upon which the straw or bedding may be spread for the animal to sleep upon.

This floor is shown in the drawing at $a$. I divide this false floor into three parts, which turn upon hinges, shown at $b\ b'$. The two parts $c\ c$ are divided in the direction of the length of the stall, and extend for about two-thirds of the length of the same, turning upon their hinges towards the sides, where they are secured by hooks, as at $d\ d$. The third portion of the floor extends across the upper end of the stall, turning up towards the back, and under the manger, where it is fastened by a hook or button, seen at $k$. Between this part of the floor and the upper end of the stall, beneath the manger, is left a space or bedding-box, sufficiently large to store the straw or other bedding in during the day. The sides of this box are perforated with holes, allowing a free circulation of air, which is needed to properly dry the straw, &c. These holes are seen at $m$. It will be seen that it is not necessary to remove the horse from the stall when putting down or raising this false floor, as he can be made to step to one side, while the floor is raised or lowered on the other. Both the secondary or night-floor, and the ordinary floor underneath, may be provided with longitudinal openings corresponding, the one with the other, to allow the water to escape freely, as usually done in common stalls.

I do not claim providing animal-stalls with a second floor, which may be, when the animal is out of the stall, lifted up so as to cleanse the lower floor. My invention has in view providing a night-floor, which may be raised, one side at a time, while the horse is in the stall, and be kept so raised during the day, and dropped at night, so that the horse may have a dry floor to lie upon.

Different from the patent of Z. G. Garlick, July 21, 1863, numbered 39,283, my invention may be used and occupied by the animal when the upper floor is turned up against the sides of the stall.

What I claim as my invention, and desire to secure by Letters Patent, is—

The improved stall, substantially as described, combining the secondary floor and bedding-box, as and for the purposes set forth.

LOUIS B. F. ZITKOV.

Witnesses:
W. H. CLIFFORD,
HENRY C. HOUSTON.